No. 620,790. Patented Mar. 7, 1899.
D. MARCUS.
VELOCIPEDE.
(Application filed Dec. 10, 1897.)

(No Model.)

WITNESSES:

INVENTOR
DAVID MARCUS
BY
Howson and Howson
HIS ATTORNEYS.

United States Patent Office.

DAVID MARCUS, OF LONDON, ENGLAND.

VELOCIPEDE.

SPECIFICATION forming part of Letters Patent No. 620,790, dated March 7, 1899.

Application filed December 10, 1897. Serial No. 661,369. (No model.)

*To all whom it may concern:*

Be it known that I, DAVID MARCUS, merchant, a subject of the Queen of Great Britain and Ireland, residing at 149 Fenchurch street, in the city of London, England, have invented certain Improvements in Velocipedes, (for which I have obtained a patent in Great Britain, No. 21,708, dated October 1, 1896,) of which the following is a specification.

The object of my invention is to provide velocipedes which present the advantages of bicycles as regards ease of traction and of tricycles as regards safety, the velocipedes constructed in accordance with my invention, moreover, preventing vibration and side slip and possessing ease, steadiness, and safety in running and perfect stability.

According to my invention I provide in place of the single wheel used as one of the wheels of a bicycle, and by preference in place of the hinder wheel, a twin wheel formed by the connection of two independent rims to collars on the hub by means of spokes arranged in such a manner that the inner and outer sets of spokes extend from the respective rims and join the hub at equal angles, and that the inner sets of spokes are interlocked with or cross each other transversely to the hub. The rims may be at any suitable distance apart which will allow of such crossing of the inner sets of spokes and allow of a chain-wheel being used between the inner sets of spokes and outward of the place where they cross each other. The twin wheel thus formed can be driven centrally by providing a frame which will allow of the central placing and working of the driving-chain and the sprocket-wheel driven by the pedals. The said twin wheel is more stable and balances better than a single wheel when running straight, and in turning curves compensation is gained to meet the variation of radii by fitting the rims with pneumatic compressible or spring tires, the arrangement of the rims and spokes on the hub allowing the tires to be compressed or expanded, as the case may be, in accordance with the weight placed upon the wheel.

Figure 1:
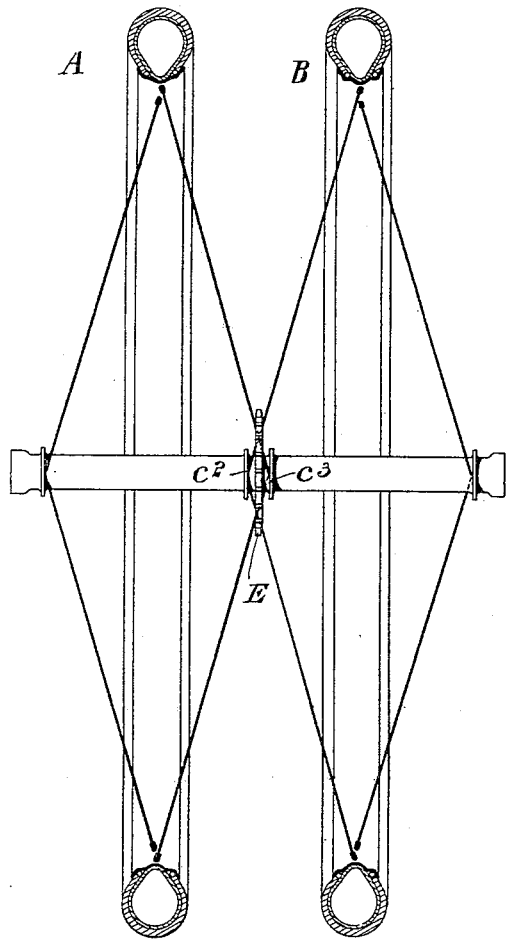
Figure 2:
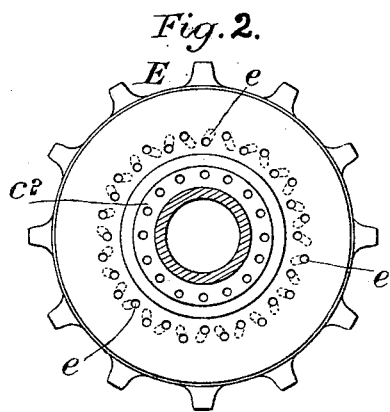

The accompanying drawings represent in Figure 1 a vertical section through the twin wheel. Fig. 2 is a view of a sprocket, showing holes or slots through which the spokes pass.

Referring to the drawings, the component wheels A B are arranged at a suitable distance apart and the sprocket wheel or ring E is situated between the inner sets of spokes outward of the place where they cross each other. The said wheel or ring E may be secured in any suitable way to the spokes or to both the hub and spokes, preferably as shown—that is, by securing the wheel E to the hub by any suitable means such as are usually employed for like purposes and by providing a circle of holes or a series of slots through and around the sprocket-wheel, as at $e$, and passing the spokes of one inner set through alternate holes in one direction and the spokes of the other inner set through the remaining alternating holes in the other direction, as shown. The spokes are connected at one end to the collars $c^2$ $c^3$ and at their other ends to the rims A B, so that they will extend at angles with the axes equal to each other, as it is important that the sets of spokes on each side of each component wheel should be at the same angle with the axis to secure the requisite stability of the twin wheel and prevent its collapse in use.

I claim as my invention—

A twin wheel for velocipedes formed by the connection of two independent rims to collars on the hub by means of spokes arranged in such a manner that the inner and outer sets of spokes extend from the respective rims and join the hub at equal angles and that the inner set of spokes are interlocked with, or cross, each other transversely to the hub, and a sprocket-wheel secured to the hub and provided with slots or holes through which the inner set of spokes pass, substantially as described.

In testimony whereof I have signed my name to this specification in the presence of two subscribing witnesses.

DAVID MARCUS.

Witnesses:
  WILLIAM JOHN WEEKS,
  PERCY READ SOLDRINE.